Figure 1:
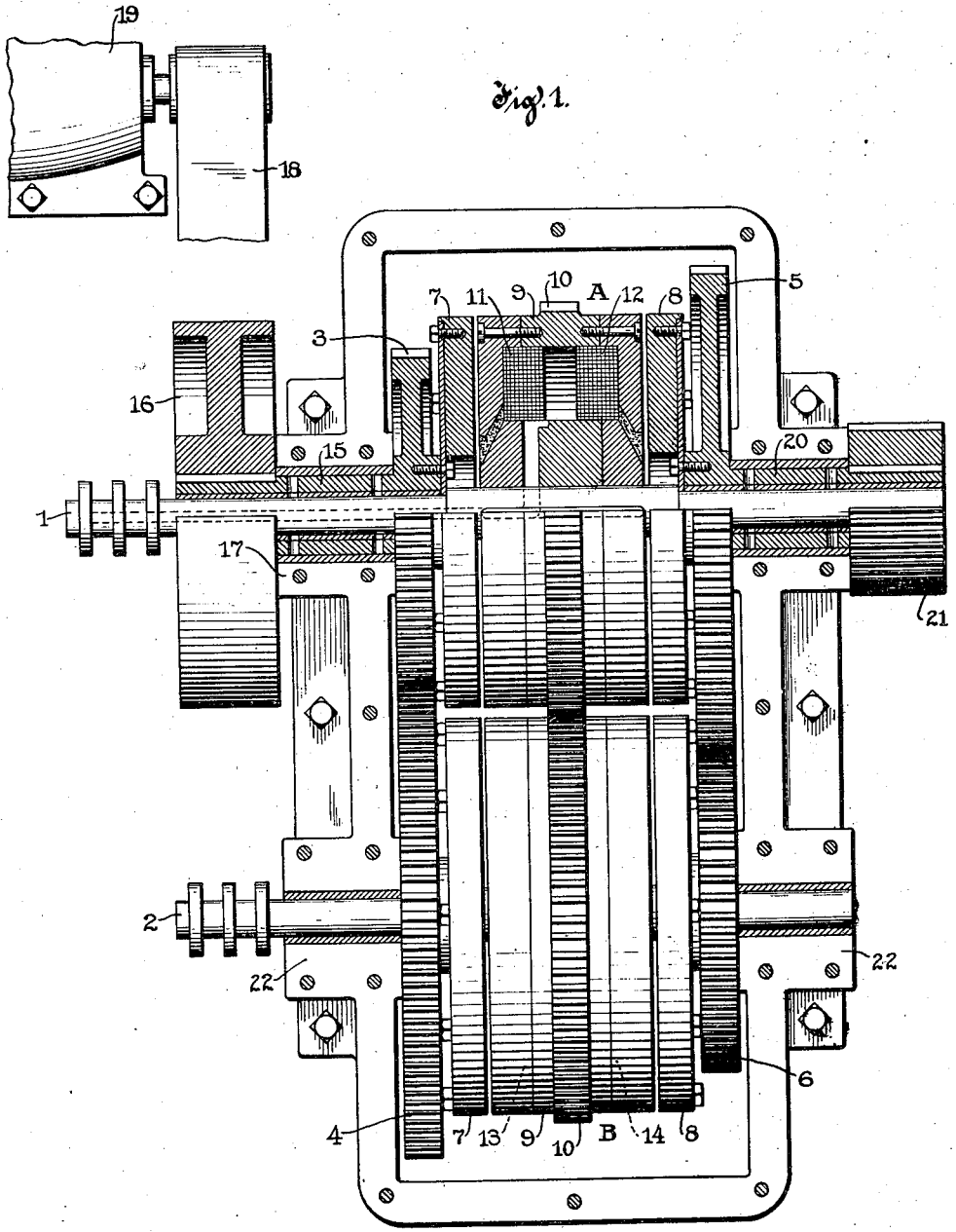

H. H. CUTLER & F. S. WILHOIT.
CIRCUIT CONTROLLER.
APPLICATION FILED AUG. 22, 1914.

1,170,738.

Patented Feb. 8, 1916.
2 SHEETS—SHEET 1.

Witnesses
J. L. Johnson
H. Walton

Inventors
Henry H. Cutler
Frederic S. Wilhoit
By Frank H. Hubbard
Attorney

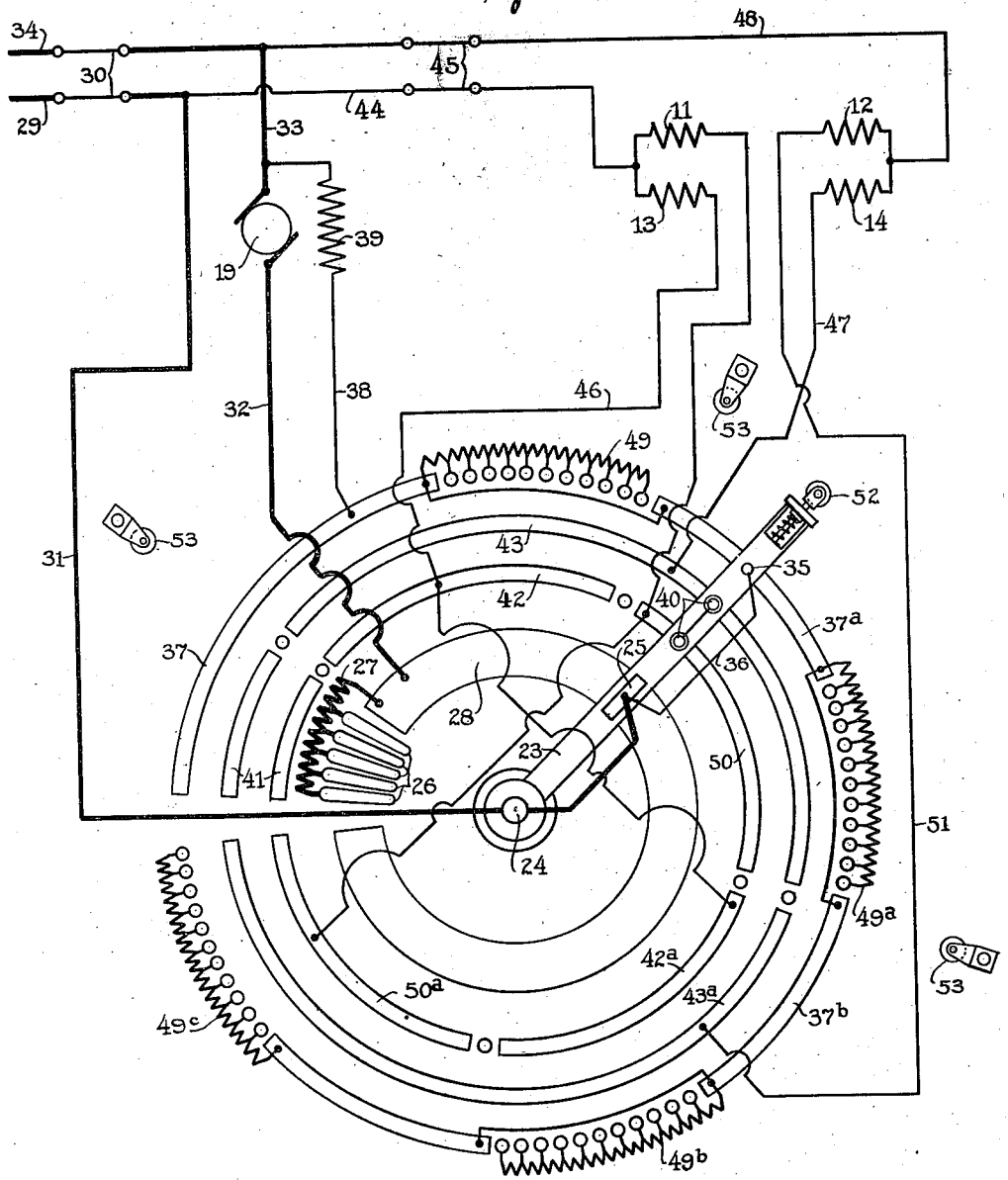

UNITED STATES PATENT OFFICE.

HENRY H. CUTLER AND FREDERIC S. WILHOIT, OF MILWAUKEE, WISCONSIN.

CIRCUIT-CONTROLLER.

1,170,738.

Specification of Letters Patent.   Patented Feb. 8, 1916.

Original application filed November 30, 1908, Serial No. 465,165. Divided and this application filed August 22, 1914. Serial No. 858,075.

*To all whom it may concern:*

Be it known that we, HENRY H. CUTLER and FREDERIC S. WILHOIT, citizens of the United States, residing at Milwaukee, in the county of Milwaukee and State of Wisconsin, have invented new and useful Improvements in Circuit-Controllers, of which the following is a full, clear, concise, and exact description, reference being had to the accompanying drawing, forming a part of this specification.

This invention relates to electric circuit controllers and more particularly to means for controlling electro-mechanical variable speed devices such as shown in our co-pending application filed Nov. 30, 1908, Serial No. 465,165, of which this application is a division.

Various objects and advantages of the invention will appear hereinafter in connection with the description of the accompanying drawing wherein, Figure 1 is a plan view of a variable speed transmission device as shown in our earlier application above mentioned; and Fig. 2 is a schematic view of a controller therefor with the circuits employed.

The device shown in Fig. 1 comprises a pair of shafts 1 and 2 having loose thereon two pairs of meshing gears 3—4 and 5—6 adapted to coact in various relations under the influence of a pair of double magnetic clutches A and B mounted on the shafts 1 and 2. Each of these clutches consists of two spaced armature members 7 and 8, respectively locked to the gears 3—5 and 4—6 and an intermediate field member 9 having a peripheral gear 10 in mesh with that of the other. Clutch A is provided with two independent field windings 11 and 12 and clutch B with similar windings 13 and 14 (not shown). The member 9 is preferably constructed in accordance with U. S. Patent No. 786,411 granted April 5, 1905 to H. H. Cutler which discloses a magnetic clutch enabling a driven member under maximum load to be accelerated from rest up to synchronism with a driving member operating at maximum speed without strain or jar on the driven mechanism. Briefly stated this result is obtained by entirely surrounding the magnet windings with iron so that the strength of the field will increase slowly when the clutch is energized due to the large amount of inductance. The gear 3 is provided with, or attached to, a quill or hub 15 having a pulley 16 keyed thereto on the opposite side of a suitable bearing 17. This pulley is arranged to be driven by a belt 18 from the shaft of a driving motor 19. The gear 5 is likewise provided with a hub 20 encircling the shaft 1 and having keyed thereto a gear 21 for connection to the driven mechanism. In operation, gears 3 and 5 constitute the driving and driven gears, respectively. In a similar manner gears 4 and 6 are also provided with hubs (not shown) loosely journaled in bearings 22 and loosely encircling the shaft 2. The ratio of the four transmission gears 3, 4, 5, and 6 is such that four basic variations in the driven speed may be secured by connections thereof in different combinations through the clutches A and B. To wit, slow speed is effected by a drive through gears 3, 4 across clutch B and through gears 6, 5; second speed through gears 3, 4, field members 9, to gear 5; third speed through gear 3, field members 9 through gears 6, 5; and high speed by directly connecting gears 3 and 5 across field member 9 of clutch A.

The above description of the transmission device has been made brief since our improved controlling device is adapted for use with various forms of transmission gearing.

Referring to Sheet 2 of the drawings, our controller is shown schematically with the circuit connections for the driving motor and the electro-responsive devices for the transmission gears. As represented, a control lever 23 is pivoted to rotate about a hub 24 to successively establish the different gear connections and during each connection accelerate the motor from normal to maximum speed. Thus, while the variable speed gearing enables four distinct fundamental speeds, the controller associates these speeds so that the step from one to the next is gradual and the acceleration of the driven mechanism from rest to maximum is accomplished smoothly and evenly. As shown, the control lever 23 carries a brush 25 adapted to engage contact buttons 26 to complete the armature circuit of the motor 19, accelerate the latter by removing resistance 27 prior to energization of the magnetic clutches and thereafter maintain the armature circuit closed through engagement with a contact ring 28. The armature circuit mentioned is established from line 29 through a manual switch 30 by conductor 31 to brush 25, contact ring 28, conductor 32 across the motor and by conductor 33 to the opposite line 34. For establishing the field circuit of the motor the lever 23 carries a brush 35 connected by conductor 36 to brush 25 and adapted to engage a contact ring 37 connected by conductor 38 to the motor field 39 and thence to the opposite line 34. The field windings 11, 12, 13, and 14 of the magnetic clutches A and B are arranged to be energized in a sequence to establish the progressive speeds of the driven mechanism as the control lever 23 is rotated. In the arrangement shown, only two of the windings are simultaneously energized and these are connected in series by means of contact segments bridged by brushes 40 carried by the control lever 23, as will appear. Assuming the control lever to be in off position and moved so that the armature circuit of the motor is completed with the inclusion of resistance 27, brushes 40 rest upon dead segments 41, while brush 35 engages contact 37 and completes the motor field circuit. Clockwise rotation of the lever then gradually removes the starting resistance 27 and thus brings the motor to normal speed at the time brush 25 engages contact ring 28. A moment later, brushes 40 engage and bridge a pair of contact segments 42 and 43, whereupon circuit may be traced from the line 29, along conductor 44 and through a hand switch 45 to the winding 13 of clutch B, by conductor 46 to segment 42, across the brushes 40 to segment 43, by conductor 47 through the winding 14 of clutch B by conductor 48 back to line 34. The low speed drive of the gear 21 is thus established with the motor running at normal speed. Continued rotation of the control lever maintains the gear connection described and increases the speed of the motor to maximum by inserting portions of a resistance 49 into the field circuit of the motor. Such acceleration continues until rotation of the lever carries the brush 35 from the last contact button of resistance 49 to adjacent segment 37$^a$ thereby short-circuiting the resistance 49 and reducing the speed of the motor to normal. During this transition one of the brushes 40 leaves contact segment 42 and interrupts circuit of the magnet field windings 13 and 14 so that the driven gear 5 is temporarily totally disconnected from the source of power supply. This interruption is only momentary and the next gear connection is established by energization of the windings 11 and 14 as the control lever moves to bridge contact segments 50 and 43 by brushes 40, current passing from winding 11 to segment 50 and thence as described. This gear connection as mentioned, is effected while the motor is operating at normal speed and is maintained while the motor is accelerated to maximum by the gradual insertion of the resistance 49$^a$. The motor is a second time reduced to normal speed and the drive of the driven member simultaneously interrupted prior to the establishment of the next gear connection which occurs after the brush 35 has passed to contact segment 37$^b$ and brushes 40 have passed to contact segment 42$^a$ and 43$^a$. The magnet circuits are thereupon completed through winding 13 by conductor 46 to contact segment 42$^a$ across brushes 40 to segment 43$^a$ and by conductor 51 to winding 12 and back to the opposite line. The third speed connection of the driven mechanism is thus established and is maintained while the motor is accelerated by the gradual insertion of resistance 49$^b$ in the motor field. When the lever is moved to short circuit resistance 49$^b$ the driving connections are again momentarily interrupted as one of the brushes 40 passes from contact segment 42$^a$ to 50$^a$. The gears are then connected in their fourth combination by energization of windings 11 and 12, that is, the driving and driven gears are directly connected to establish high speed of the driven mechanism. The speed of the motor is again accelerated to maximum as the brush 35 gradually inserts resistance 49$^c$ in the motor field. It will thus be seen that the motor 19, variable in speed within relatively narrow limits, and the transmission gearing adapted to establish four basic speeds, are associated by the controller so that the driven member is gradually and evenly accelerated from rest through the successive basic speeds to its maximum rate. It will be apparent also that the rotation of the control lever 23 in the opposite direction decelerates the driven mechanism by establishing the gear connections in the same combinations but in a reverse sequence to that already described.

In order that the lever 23 may not permanently stop with one of the brushes 40 between any of the contact segments of the magnet windings, in which position the driving connection between the power supply and the driven mechanism is totally interrupted and which condition if continued would allow the driven mechanism to come to rest, we provide the control lever with a roller 52 biased outwardly by a coil spring to strike complementary stationary rollers 53 arranged approximately at quadrants about the hub 24 but alined with the interruptions between the contact segments for the magnet windings. By this means, as the control lever is rotated the roller 52 engages a stationary roller 53 just prior to a change in the gear connections and the energy stored in the coil spring by further movement of the lever impels the latter far enough to establish the next gear connection.

It is to be noted that the provision of hand switch 45 in the circuit of the magnetic clutches enables all driving connection to be interrupted independently of the motor and of the control lever 23. In the case of large machinery, several of the switches 45 may be located at various points conveniently accessible to the operators so that, in the event of an accident, the driven mechanism may be immediately stopped without recourse to the control rheostat.

What we claim as new and desire to secure by Letters Patent is:

1. The combination with a variable speed gearing, of a plurality of magnetic clutches each having a driving member and two driven members, one of said driven members being engageable with either said driving member or the other driven member, the corresponding members of said clutches being connected and means to gradually accelerate the speed of said driven members when connected to the driving member.

2. The combination with a plurality of magnetic clutches, of a controller therefor having an element movable to effect energization and deënergization of said clutches separately and means insuring against stoppage of said element at an intermediate point to deënergize all of said clutches.

3. The combination with a plurality of magnetic clutches, of a controller therefor having an element movable over a series of contacts and means to prevent said element from stopping at a point between said contacts.

4. The combination with a motor, of a plurality of magnetic clutches, a rheostat having a movable element adapted to be moved over a series of contacts for controlling said motor and said clutches and means insuring against the stoppage of said element at an intermediate point between said contacts.

5. The combination with a supply circuit, of a motor arranged in said circuit, an armature resistance and a field resistance for said motor, a plurality of magnetic clutches arranged in said circuit, and means for controlling said motor and said clutches, said means having a movable element operable to remove said armature resistance from circuit before said clutches are energized and to insert said field resistance in circuit only after one of said clutches is energized.

6. The combination with a supply circuit, of a motor connected in said circuit, an armature resistance and a field resistance for said motor, a plurality of magnetic clutches arranged in said circuit, a movable element for controlling said motor and said clutches, said movable element being operable to energize said clutches only after the starting of said motor and the removal of said armature resistance from circuit and being operable to insert said field resistance in circuit only after the energization of one of said clutches.

7. The combination with a source of power, a member to be driven, and variable speed gearing interposed therebetween including a driving gear, a driven gear and a plurality of free gears, power means to effect the direct connection of said driving and driven gears to establish one driving connection for said member and to effect the indirect connection of said driven gears through one or more of said free gears to establish other driving connections for said member, of means for controlling said power means, said last-mentioned means being operable to effect a change in the gear connections of said gearing only after a temporary total interruption of drive from said source of power to said member.

8. The combination with a source of power, a member to be driven, and variable speed gearing interposed therebetween including a driving gear, a driven gear axially alined therewith and a plurality of free gears offset with respect thereto, of power means to effect driving connections between said driving and driven gears directly and between the same in different combinations with said free gears for establishing different basic speeds of said member, and manually operated means for controlling said power means but operable to effect a change in the driving connections of said gears only after a complete interruption of the drive of said member from said source of power.

9. The combination with a power supply, a member to be driven, and variable speed gearing interposed therebetween including a driving gear a driven gear axially alined therewith and a plurality of free gears offset with respect thereto, of power means to effect driving connections between said driving and driven gears directly and between the same in different combinations with said free gears for establishing different basic speeds of said member, manually operated means for controlling said power means but operable to effect a change in the driving connections of said gears only after a complete cessation of power transmission from said supply to said member and means independent of said manually operated means for effecting cessation of power transmission from said supply to said member without affecting said supply.

10. The combination with axially alined driving and driven shafts, a fixed gear on each thereof, a counter shaft with a plurality of gears thereon, of electro-responsive devices for effecting driving connections of said fixed gears through one or more of said gears on said counter shaft to establish different minor speeds of said driven shaft and to effect direct driving connection of said fixed gears to establish a major speed of said driven shaft, and manually operated means for controlling said devices but operable to effect a change in the driving connection of said gears only after the temporary interruption of drive of said driven shaft through the preceding gear connection.

11. The combination with a driving shaft, a fixed gear thereon, an alined driven shaft, a fixed gear thereon, a counter shaft, a plurality of gears thereon, of electro-responsive devices for effecting driving connections of said fixed gears in different operative combinations to establish different basic speeds of said driven shaft, and means for controlling said devices and insuring the disconnection of said gears in one combination prior to the driving connection thereof in another combination.

In witness whereof, we have hereunto subscribed our names in the presence of two witnesses.

HENRY H. CUTLER.

Witnesses:
C. H. MILLER,
E. J. HIGBEE.

FREDERIC S. WILHOIT.

Witnesses:
ELIZABETH EBERLY,
L. A. WATSON.